United States Patent [19]
Snow

[11] 3,791,065
[45] Feb. 12, 1974

[54] ANIMAL TRAP

[76] Inventor: Frank H. Snow, 1208 E. Idlewild Ave., Tampa, Fla. 33604

[22] Filed: Feb. 23, 1973

[21] Appl. No.: 335,042

[52] U.S. Cl. .................................... 43/69, 43/74
[51] Int. Cl. ........................................ A01m 23/04
[58] Field of Search ......... 43/69, 74, 70, 72, 58, 60, 43/61, 78, 124

[56] References Cited
UNITED STATES PATENTS

| | | | |
|---|---|---|---|
| 464,479 | 12/1891 | Murphy et al. | 43/74 |
| 1,389,636 | 9/1921 | Eastridge | 43/69 |
| 1,501,378 | 7/1924 | Talisman | 43/69 |
| 2,741,866 | 4/1956 | Shirley | 43/69 |
| 2,835,070 | 5/1958 | Gomez | 43/69 |
| 3,733,735 | 5/1973 | Hirsch | 43/61 |

FOREIGN PATENTS OR APPLICATIONS

| | | | |
|---|---|---|---|
| 714,418 | 9/1931 | France | 43/58 |
| 144,575 | 6/1920 | Great Britain | 43/58 |

Primary Examiner—Louis G. Mancene
Assistant Examiner—James H. Czerwonky
Attorney, Agent, or Firm—Stein, Orman & Fisher

[57] ABSTRACT

This invention relates to an animal trap including an air tight chamber in which an animal is forced by automatic release of bait by the animal, when located on an animal attracting means. A plurality of weights are interconnected to various pieces of bait arranged in predetermined configuration over a movably mounted chamber entrance door wherein removal of the bait causes release of at least one weight so as to drop onto the entrance door thereby opening it and forcing, due to gravity, the animal to fall into the chamber. The entrance door is normally held in a closed position by a releasable connector means. The chamber may or may not be air tight causing death of the animal by suffocation.

24 Claims, 9 Drawing Figures

PATENTED FEB 12 1974 3,791,065
SHEET 2 OF 3

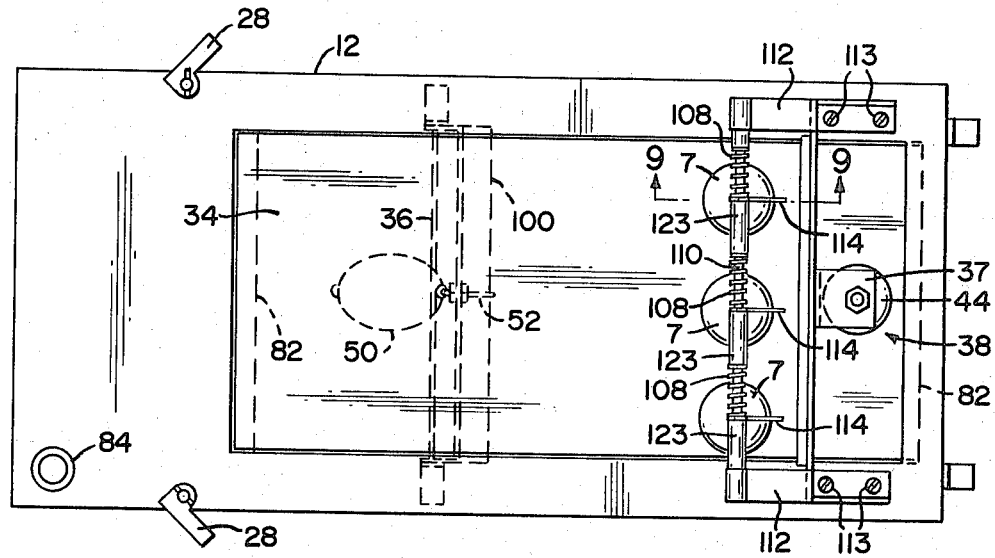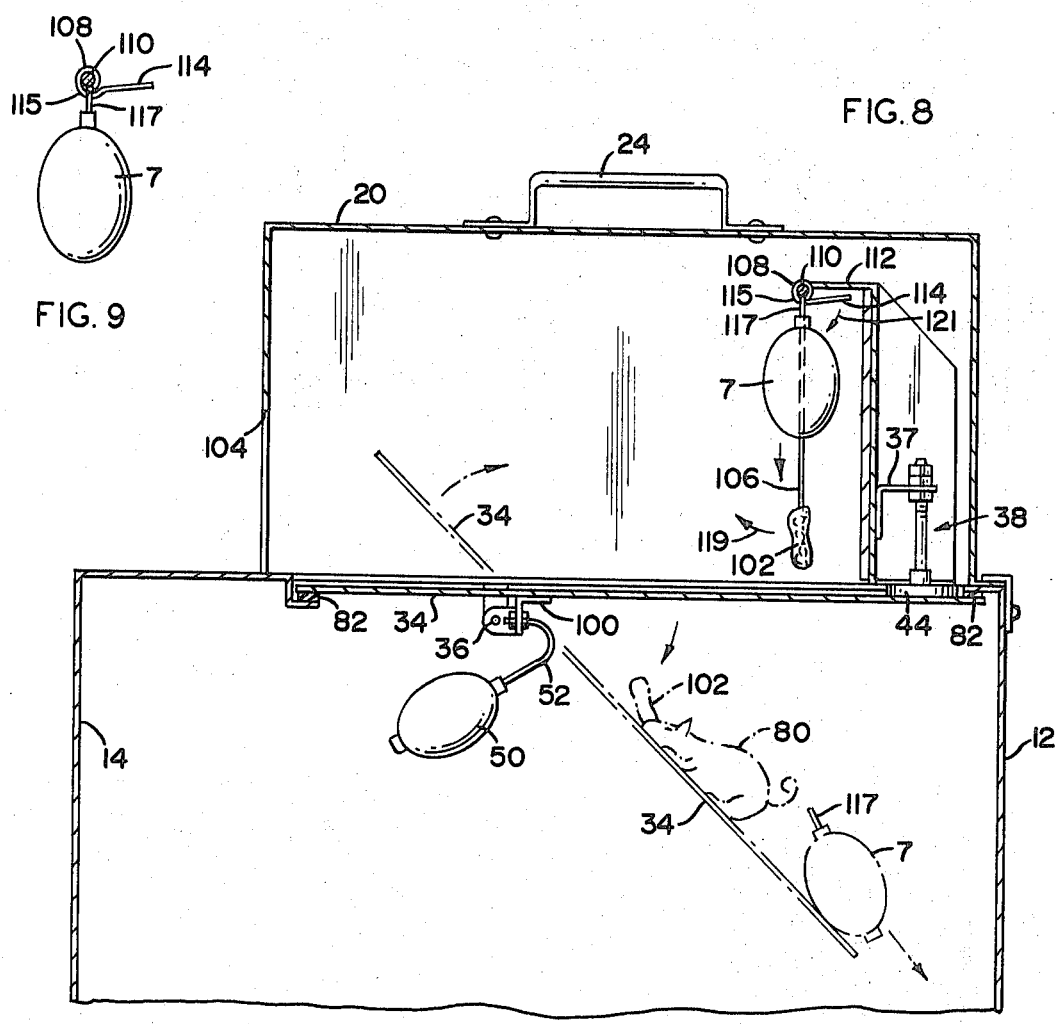

ANIMAL TRAP

BACKGROUND OF THE INVENTION

1. Field of the Invention

This invention relates to an animal trap utilizing bait to attract an animal to a given area to be positioned thereon whereupon removal of the bait causes automatic opening of a chamber in which the animal is trapped.

2. Description of the Prior Art

Rats and similar rodents have accompanied men to most of the areas of the world he has settled. The major source of concern regarding rats is that they are carriers of dangerous diseases. Rats mice and the like are responsible for the wide spread of a number of diseases, either directly, as by contamination of human food with their urine or feces, or indirectly, by way of rodent fleas and mites. The more common of these diseases are: Rat-Bite Fever, Leptospirosis, Salmonellosis, salmonellosis, Trichinosis, Murine Typhus Fever, Plague and Rickettsialpox. As a result they have been responsible for more human illness and deaths than any other group of mammals.

The worst of these, bubonic plague, was reported as recently as January 1971, when the plague was identified from a lot of 50 fleas collected from 23 Norway rats trapped in Tacoma, Washington. These fleas may infect household pets and eventually may reach and infect human beings.

In addition, rodents have been among the most persistent and damaging pests in causing enormous economic losses. They consume or contaminate vast quantities of food and feed in stores and warehouses as well as destroy other property.

No reliable estimate of the rat population of the United States is available as a basis for calculating these losses, but the figure of one rat for every person is frequently quoted. Assuming improvements in environmental sanitation and rodent control has reduced by one-half, then the United States has some 100,000,000 rats. Since each rat damages between $1 and $10 worth of food and other materials per year by gnawing and feeding, the total direct economic losses to the United States could be $1,000,000,000 annually.

In his efforts to rid himself of this nemesis, man has attempted to eliminate the sources of food and shelter for these rats. However, the greatest amount of effort has been in poisons and traps.

Popular devices and methods of eliminating undesirable rodents include luring or enticing the animal into a trapping device. Unfortunately, rats are keenly aware of changes in their environment. Thus, the effectiveness of such devices depend directly upon their design and structure.

As a result, one of the most popular and effective methods of killing rats is by poisoning which is often dangerous or unsafe to humans or pets. In addition, many undesirable animals often appear to have a sharp intelligence in matters directly related to their survival and are able to recognize a poison and stop from consuming fatal quantities of such poisons.

Despite the sometimes limited effectiveness of mechanical traps for capturing and exterminating rodents, many various types have been known in the art for years. A review of numerous electromechanical devices developed shows advances in the sophistication of the art. However, failure of such traps to be effective can be blamed directly on their inefficient design and structure.

Despite the endless efforts to contain and reduce the rat population federal officials and other authorities report that on a nationwide basis the rat population continues to increase for lack of adequate means to trap and exterminate these rodents.

Accordingly, it can be seen that there is a need for an animal trap which is efficient in operation and effective to kill or otherwise eliminate the various rodent-type animals which are undesirable to society. Such a trap should be simple in construction so as to make its initial purchase in maintenance or replacement reasonable while at the same time having a structural design capable of enticing rodents into a desired area for their elimination.

SUMMARY OF THE INVENTION

This invention relates to an animal trap of the type generally designed to capture and/or kill rats, mice and like rodents. However, it is emphasized that the structure of the subject trap lends itself for the capturing of a wide variety of animals other than rats and mice.

More particularly, the trap comprises a housing having a chamber means which is defined by the interior of the housing itself. This chamber is arranged in communicating relation with an animal attraction means which includes an area immediately above the chamber. The chamber and the attraction means are separated by a chamber entrance means which may be in the form of a door or plate pivotally mounted to the housing and having connected thereto a biasing means serving to automatically return the entrance to a closed chamber position after it has automatically opened. This biasing means may be in the form of a counter balanced weight or a spring arrangement which will be described in detail hereinafter.

A connector means is mounted on the trap so as to releasably engage the entrance means. This connector means may be in the form of a permanent magnet or the like capable of maintaining the entrance in a closed position while at the same time allowing the release of the entrance therefrom upon activation of the trap as will be explained.

The animal attraction means comprises a plurality of pieces of bait arranged in a predetermined configuration. A particular configuration or array of the bait pieces is arcuate or substantially semi-circular which has been found, through testing, to be most efficient for the capture of the largest number of animals without resetting of the trap. The bait is positioned by bait locating elements in the form of a plurality of apertures positioned in the predetermined array as described above. These apertures are formed in a support plate arranged substantially perpendicular to the entrance to the chamber. The pieces of bait are connected to interconnecting means which serves to interconnect the bait to the activation means. The activation means are in the form of a plurality of weights each of which is removably detached to the bait by this interconnecting means. Each of the interconnecting means may be in the form of flexible cords or the like. Each cord is attached at one end by a loop or the like to an individual piece of bait which is positioned adjacent to an individual bait locating element as described. The other end of the cord is attached to an individual weight. The weight is positioned immediately above the entrance means such that upon release of the bait from the interconnecting means or cord, gravity forces the weight to fall into engagement with the entrance thereby opening it and causing the animal to fall into the chamber. Each of the cords of the interconnecting means have a different length due to the fact that the weights are arranged in spaced substantially linear relation to one another. The length of each cord connected to a given weight is dependent upon its predetermined position. In order to facilitate rebaiting of the trap, each of the weights may be coded so as to properly position them relative to their desired arrangement on the support plate and the bait locating element which they cooperate with.

An access means in the form of foldable ramps or the like may also be attached to the exterior of the housing to faciliate the animal reaching the bait attracting area. In addition an enclosure having a sufficient access opening may be mounted so as to at least partially enclose the animal attracting area.

In operation an animal positions himself adjacent the animal attracting area because of his attraction to the bait placed thereon. In this position the animal is positioned on the entrance means, immediately above the chamber. Upon removal of a single piece of bait, the interconnecting means becomes disconnected from the support plate thereby allowing the single weight of the activating means to drop onto the entrance plates. The force of the weight engaging the entrance means causes its disengagement from the connector magnet and since the animal is resting on this entrance door, he is caused to fall into the chamber as the door pivots into its opened position. The counterbalance or biasing means on the door forces it to return into the closed position and in engagement with the connector means. Since the housing is air tight, death of the aminal is caused by suffocation. To ensure this suffocation, a seal is placed around the periphery of the entrance and is arranged to engage the correspondingly positioned perimeter of the entrance door and maintain a sealing engagement therewith.

A vent means in the form of a standard removable plug valve or any applicable venting structure may be formed in the housing so as to vent the interior or chamber to atmosphere. This is provided in case the animal is desired to be trapped alive instead of being eliminated.

Another embodiment of the present invention includes a modification of the interconnecting means which serves to removably mount the plurality of weights immediately above the trapped door wherein the interconnecting means is further directly attached to the bait pieces to the extent that movement or release of the bait pieces in the desired direction serves to automatically release the bait which then falls, by gravity, onto the trap door causing the rodent or other animal to fall within the trap chamber means where he is captured or disposed of as desired. More specifically, in the present embodiment, the trap door leading to the chamber may extend substantially along the longitudinal axis of the housing and be pivotally connected off its center in such a manner that the rear portion of the trap farthest from the bait will pivot upwardly or into the enclosure covering the attraction area so as to substantially close off the opening thereto. The opposite end, of course, pivots into the chamber itself and causes the disposition of the animal within the chamber along with the activating weight which caused the trap door to open. A plurality of weights are removably mounted onto a rod or shaft extending travsversely to the longitudinal axis of the trap door adjacent with the end or extremity of the door located farthest from the opening of the enclosure. Each of these weight elements which comprise the activating means are removably connected to the shaft by interconnecting means which serve both to mount the weight on this shaft and also to position the bait pieces within reach of the animal entering the enclosure.

The interconnecting means comprises a wire or like material element having an elongated section extending downwardly from the transversely located shaft and an upper section which is coiled about the shaft in a specific predetermined configuration. A wire element of this type is mounted on the shaft for each of the weight elements provided. At one end of the coil configuration, a last loop is specifically configured to have a generally enlarged spaced away portion from the shaft and outwardly extending finger integrally attached to this last loop which defines the coil. The wire element is ideally formed of one piece such that rotation or movement of the wire in the desired manner by the animal contacting the bait piece attached thereto causes rotation of the coil portion and finger attached thereto. This, in turn, forces the weight to slide from the finger and enlarged end loop and thereby fall upon the trap door dislodging it from the connector means which maintains the trap door in closed position.

A plurality of spacer members are positioned between each of the wire elements and mounted on the shaft to provide proper placement of both the weight elements and the bait pieces attached to the wire elements.

In this embodiment, the attracting means further comprises a bait storage area made of a plexiglass or generally transparent material which allows the animal entering the enclosure to view other bait. This bait storage area is located immediately adjacent to and behind the bait elements attached to the interconnecting means so as to further attract the animal to this general location. In addition, the position of the storage area forces rotation of the bait and attached wire element in the desired direction to cause the weight to fall from the extended finger member and onto the trap door.

Regardless of the embodiment used, it is important to note that the connector magnet is specifically provided with enough magnetic force to fixedly hold the closure door so as to give the rodent the feel of being on sound footing. Again the force of the magnet should engage the closure door with sufficient force to maintain the weight of rodent located thereon. Separation of the door from the magnet should only be accomplished by force of the weight engaging the door thereby breaking the attractive force of the magnet. If the force of the magnet is not sufficiently strong, the rodent may be suspicious of taking the bait due to an unsure or shaky footing.

This invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 7 is a top plan view of another embodiment of the present invention.

FIG. 8 is a sectional view showing the interior of the enclosure, trap chamber and mvement of the trap door shown in broken lines.

FIG. 9 is a detailed sectional view taken along line 9—9 of FIG. 7.

Similar reference characters refer to similar parts throughout the several views of the drawings.

DETAILED DESCRIPTION

This invention relates to an animal trap primarily designed to trap and/or kill rats, mice and like rodents but structurally capable of trapping and disposing of a number of variety of animals.

Figure 1:
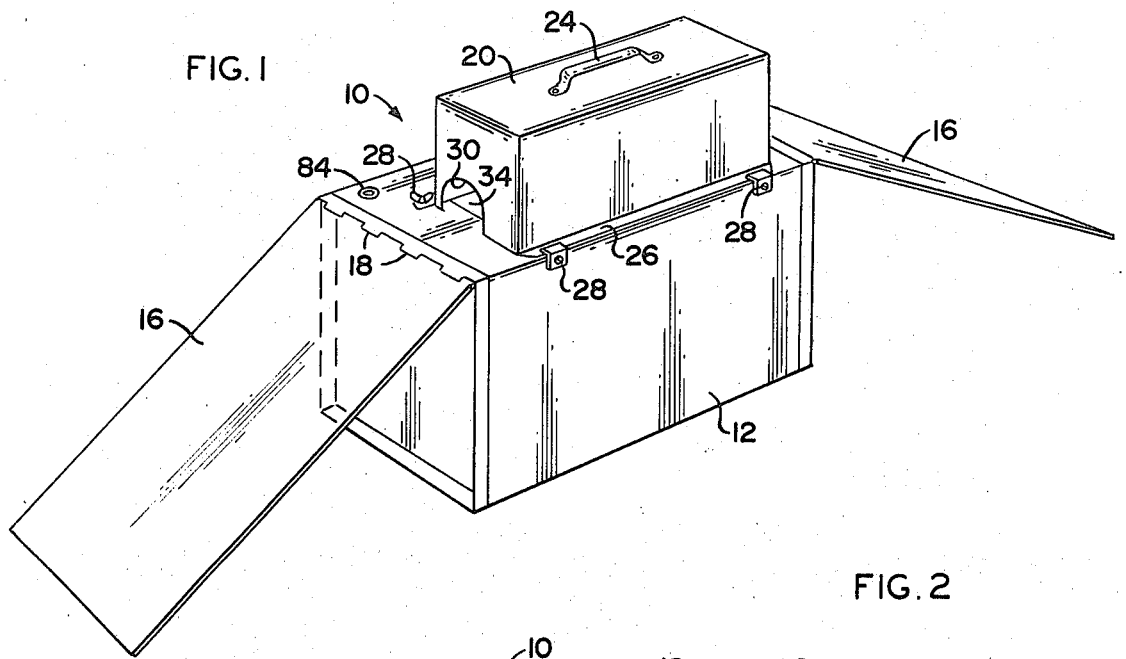
FIG. 1 is a front elevational view of the exterior of the trap of the invention.
Figure 4:
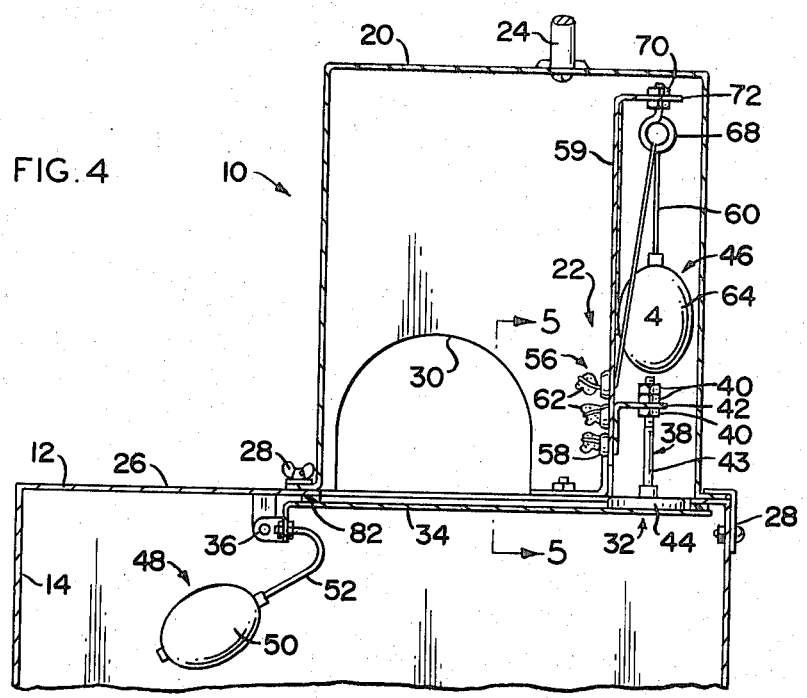
FIG. 4 is a side sectional view showing the interior of the chamber means and the animal attraction means.
Figure 5:
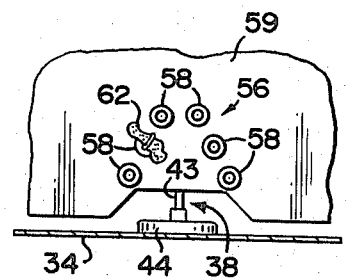
FIG. 5 is a detailed view of a portion of the attraction means.
Figure 6:
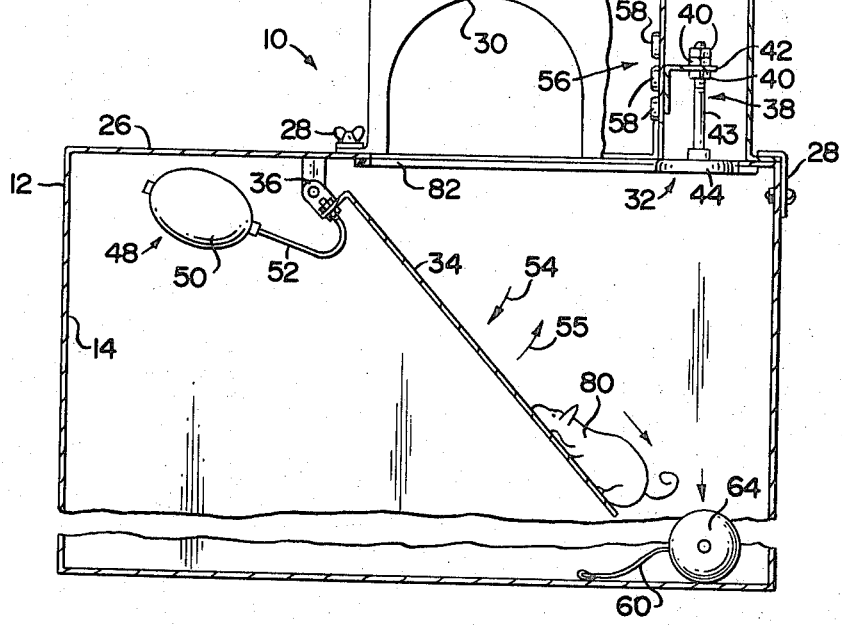
FIG. 6 in operation. cutaway, partial sectional view of the trap present invention.

The trap is generally indicated as 10 in FIG. 1 and comprises a housing 12 which defines a trap chamber means 14 (FIGS. 4 and 6). Access means in the form of ramps 16 are movably or pivotally connected to the top of housing 12 by hinge means 18. This allows the ramp 16 to be removed completely or folded in an out-of-the-way position during storage or transportation of the trap. An enclosure 20 may be provided to at least partially enclose or surround the animal attracting means generally indicated as 22 in FIG. 4. A handle or like structure 24 may be provided on the top of the enclosure 22 so as to facilitate carrying or transporting of the trap from one location to another. As shown the enclosure is fastened to the top plate or surface 26 of housing 12 by means of connectors 28. These connectors may be any applicable connector means presently available but it should be noted that in the structure disclosed the enclosure means have to be removed for "rebaiting" of the trap. Accordingly, any connector means 28 should be capable of efficiently and quickly removing the enclosure 20 from the animal attraction means. Access apertures 30 are provided at each end of the enclosure 20 so that the animal may readily find the attraction means.

Figure 2:
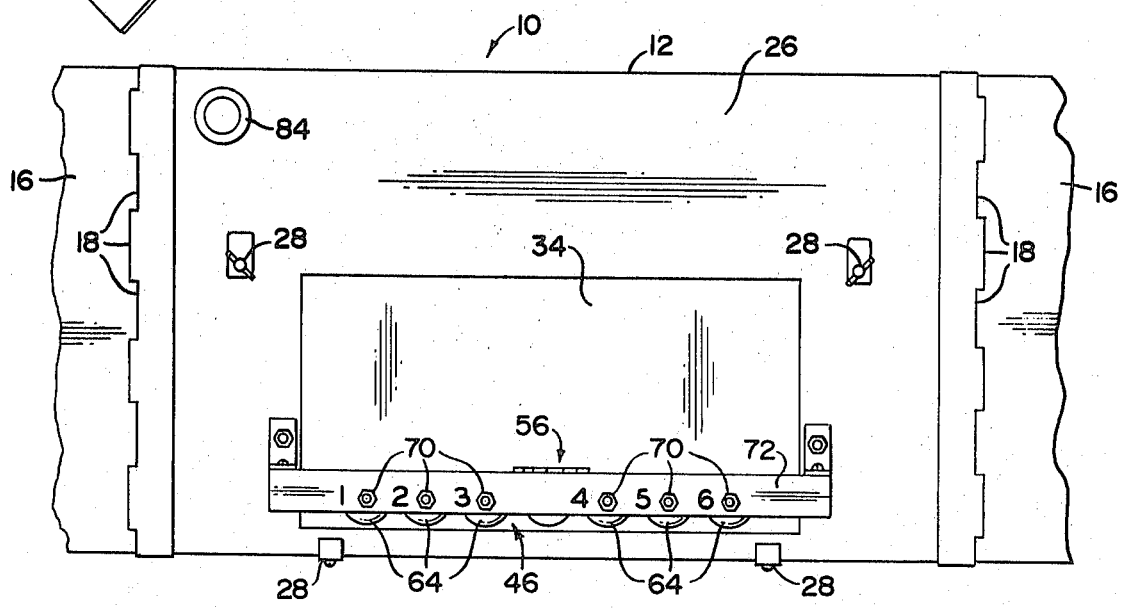
FIG. 2 is a top plan view of the animal attraction means.

Referring more particularly to FIGS. 2, 4 and 6 the attraction means of the present invention generally indicated at 22 is located in direct communicating relation with chamber 14 by an entrance means generally indicated as 32 in FIG. 4. The entrance means includes a trap entrance door 34 pivotally connected to housing 12 by hinge means 36. A connector means 38 may be provided in the form of a magnet fixedly or adjustably connected to the trap so as to directly engage the door 34 and releasably maintain it in its desired closed position as shown in FIG. 4. An adjustment means may be attached to the connector in the form of a plurality of threaded bolts 40 arranged on both sides of flange 42. By virtue of this arrangement the shaft 43 of connector 38 may be raised or lowered relative to the predetermined closed position of door 34 and of course the level of the flange 42. The head 44 may be in the form of a permanent magnet or other applicable connector means capable of quickly and efficiently releasing the door from its holding force when the door is forced opened by the activation means generally indicated as 46 which will be explained hereinafter. A biasing means generally indicated as 48 is connected to the hingedly connected edge of door 34 adjacent to the hinge structure 36. This biasing means may take the form of a weight 50 arranged in counterbalance relation to door 34 by virtue of the configuration of arm 52. The positioning of the counterbalance weight 50 relative to door 35 serves to bias the door 34 back into its closed position as shown in FIG. 4 once the door has been released from the head 44 and pivots downwardly as shown by directional arrows 54 in FIG. 6. Other biasing means can also be utilized instead of a counterbalance weight. Such biasing means can be in the form of a biasing spring also tending to return the door 34 into its closed position after it has been opened or released from head 44.

Figure 3:
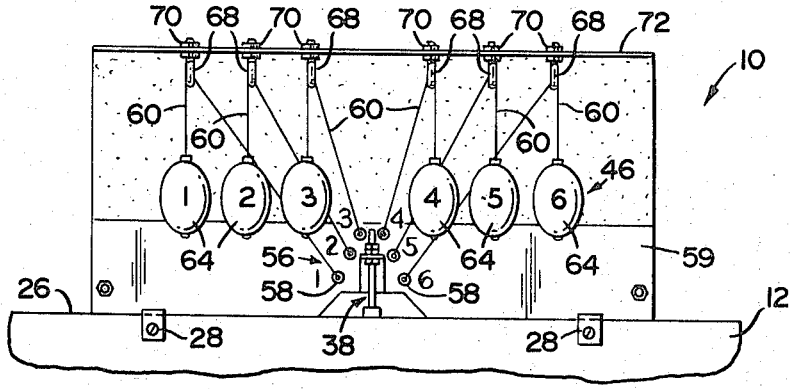
FIG. 3 is a partial rear view of the animal attraction means as shown in FIG. 2.

As clearly shown in FIGS. 2, 4 and 6 the door 34 of entrance means 32 is positioned directly below the attraction area or means 22. The attraction means itself comprises bait positioning means generally indicated as 56 including a plurality of bait locating elements 58 in the form of apertures arranged in a support plate 59. These apertures are arranged in an arcuate or other applicable predetermined configuration designed such that an animal will be attracted to one piece of bait and will be forced to substantially position himself such that his weight rests solely on door 34 as he interests himself in the bait. Interconnecting means are provided in the form of cords or flexible lines 60 (FIG. 3). These interconnecting means or cords 60 serve to removably attach the activation means to each of the pieces of bait 62 attached at one end of the connecting means. The activation means in the form of a plurality of weights 64 are fixedly attached to the opposite end of a cord. Each weight of the plurality of weights comprising the activation means is attached to a single cord which in turn is attached to a single piece of bait 62 positioned adjacent a predetermined bait locating element 58. While in the particular embodiment shown the bait is merely looped around or removably attached to one end of cord 60 wherein the opposite end is fixedly attached to weight 46 any desired combination could be utilized as long as the weight is removably or releasably attached to the attraction means and more particularly to the support plate 61. As best shown in FIG. 3, each of the weights 64 comprising the activation means are arranged in spaced, substantially linear relation to one another a sufficient distance above the front or leading, detachable edge of trap door 34. In this position they contain sufficient force, when released due to removal of the bait by an animal, to drop onto door 34 and thereby force its detachment from the connector head 44. Each of the heads are positioned in this overhanging relation to door 34 by a plurality of holders 68 which movably engage and support cords 60 and positioning the weight 64. Each of the holders or eyelets 68 are connected to support plate 61 by connectors 70 attached to overhanging, extending flange 72. As clearly shown in FIG. 3, the specific predetermined configuration of the locating elements 58 on support plate 61 and the predetermined positioning of each of the weights 64, each of the cords 60 has a fixed, predetermined length dependent upon the position of each weight relative to the corresponding locating element with which it cooperates. Due to the fixed predetermined length of each cord 60 each of the weights 64 has indicia or some sort of coding thereon which corresponds to a code indication which indicates which locating element in particular cord 60 is to cooperate.

In operation an animal 80 approaches the attracting means 22 by entering one of the access apertures 30 in enclosure 20. As the animal 80 approaches the actual bait pieces 62 of the attracting means 22 his weight is positioned entirely on door 34. As he concentrates on the particular bait to which he is attracted he has a tendency to raise up to remove the bait from the corresponding end of one of the cords 60. Upon its removal, the weight 64 to which the bait 62 is attached will be released thereby dropping onto door 34. The force of the weight dropping thereon causes it to release from connector 38 by breaking the magnetic attraction between the door and magnetic head 44. Since the animal 80 is supported entirely on the door he will fall into chamber 14 along with the weight 64 which causes the door to open. The door will then rotate into its opened position as indicated by directional arrow 54. After the animal 80 falls from the door itself the biasing force due to the counter balance weight 50 or other biasing means forces the door to pivot back to its closed position (FIG. 4) as indicated by directional arrow 55 (FIG. 6). The housing 12 is specifically designed to be of a closed construction being sufficiently airtight to cause suffocation of the animal once he is placed in the chamber 14. Accordingly, a seal means 82 is placed around the opening of the housing which is provided for the entrance means. This seal blocks off all air and allows the chamber 14 to remain substantially airtight. It can be pointed out that airtight in the sense used with description of the present invention does not necessarily mean absolutely airtight but merely sufficiently airtight to cause suffocation of the animal once placed in chamber 14. A vent means 84 (FIG. 2) is provided on housing 12 so that the chamber means 14 may be vented to atmosphere if it is desired to capture or trap the animal 80 alive rather than dispose of him through suffocation. Such vent means may take the form of a plug valve or any applicable means capable of being opened and closed to selectively vent the chamber means 14 as desired.

FIGS. 7 through 9 relate to yet another embodiment of the present invention wherein the trap door 34 is pivotally mounted on bracket means 100 such that the door extends along the longitudinal axis of the housing 12 and pivots about the bracket which is transverse to the opening which communicates with the chamber 14 defined by the interior of housing 12. A similar biasing means in the form of weights 50 is attached to the door to provide for the automatic closing of the trap door once the rodent or other animal represented as 80 in the broken line in FIG. 8 is removed from the door and is disposed within the chamber 14. Again, in this embodiment, the bait elements 102 and associated weight elements 7 are arranged in interconnected, cooperative fashion to one another on the opposite end of enclosure 20 relative to opening 104.

The interconnecting means themselves comprises a plurality of wire elements 106 having an elongated portion wherein the extremity of this elongated portion is attached directly to the bait pieces 102. The opposite end of the extremity is formed into a coiled portion 108 arranged substantially concentric to a support shaft 110 also mounted transverse to the longitudinal axis of the trap door 34 and arranged substantially adjacent to the end of the trap door opposite to opening 104. This shaft, and the interconnecting elements mounted thereon are supported by a support member 112 connected to opposite sides of the upper surface of housing 12 immediately adjacent to the opening which the trap door 34 covers and which leads into chamber 14. Common connectors 113 may be utilized to connect the support member in this fashion.

FIG. 9 shows the specific way of attaching element 7 to the coil portion 108 of the interconnecting means. In particular, the last loop of coil portion 108 has an outwardly extending finger 114 integrally attached thereto and the coil 115 is specifically enlarged to engage means 117 attached to the weight element 7. Due to the enlarged loop 115, the position of the extended finger 114 and the position of the downwardly extending portion of the wire element connected directly to the bait 102, movement of the bait in the direction indicated by arrow 119, causes rotation of finger 114 in the direction shown by arrow 121 to the extent that weight 7 will slide therefrom and land on trap door 34 with sufficient force to dislodge it from magnet 44. This will, of course, open the trap door and allow the rodent 80 to fall into chamber 14.

The connecting means 38 is mounted in cooperative engagement with door 34 by a support bracket 37 attached to the support means 112 as shown in FIG. 8.

Spacer means 123 are arranged in spaced relation to the coil portions 108 so as to properly separate both the bait pieces 102 and the weight elements 7 from one another in the manner clearly shown in FIGS. 7 and 8.

It will thus be seen that the objects made apparent from the preceding description, are efficiently attained and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An animal trap comprising: chamber means, attraction means mounted on said trap and positioned in communicating relation with said chamber means, entrance means movably connected to said trap in intercommunicating relation between said chamber means and said attraction means, connector means mounted on said trap in engagable relation to said entrance means to tend to keep said entrance means closed, actuation means releasably interconnected to said attraction means and positioned to engage said entrance means upon release from said attraction means, whereby said entrance means is movable from its closed to an opened position when contacted by said activation means.

2. An animal trap as in claim 1 wherein said chamber means comprises a closed housing, said entrance means movably mounted on said housing between a closed and an opened position.

3. An animal trap as in claim 2 wherein said closed housing comprises vent means mounted thereon in communication with said chamber means, whereby said chamber means can be selectively vented to atmosphere.

4. An animal trap as in claim 1 wherein said entrance means comprises biasing means mounted thereon so as to return said entrance means to said closed position.

5. An animal trap as in claim 4 wherein said biasing means comprises a counter-balanced weight mounted on one portion of said entrance means so as to bias it into closed position subsequent to its release from said connection means.

6. An animal trap as in claim 1 wherein said connector means comprises a magnet.

7. An animal trap as in claim 1 wherein said actuation means comprises weight means mounted above said entrance means, said weight means being releasably connected to fall upon said entrance means, whereby the weight of said weight means forces disengagement of said entrance means from said connector means.

8. An animal trap as in claim 7 wherein said weight means comprises a plurality of weights arranged in spaced relation to one another, interconnecting means removably and independently interconnecting each of said weights to a respective one of said attraction means.

9. An animal trap as in claim 8 wherein said interconnecting means comprises a plurality of cords, each cord detachably connected to a separate weight, bait fastening means connected to each end of said cord and structured to releasably hold a portion of bait.

10. An animal trap as in claim 9 wherein each of said cords comprises a different length dependent upon the predetermined position of the corresponding weight attached thereto.

11. An animal trap as in claim 9 wherein each of said weights includes coding means attached thereto, said coding means dependent upon the dimensions of said cord and determinative of the operative position of said weight.

12. An animal trap as in claim 9 wherein said attraction means comprises bait positioning means mounted on said trap and arranged in predetermined position adjacent said entrance means, whereby animals attracted thereto are positioned in communicating relation to said chamber means.

13. An animal trap as in claim 12 further comprising a plurality of locating elements each mounted on said trap and arranged in a predetermined configuration relative to one another, each element releasably interconnected to said actuation means, whereby release of said actuating means therefrom causes engagement between said entrance means and said actuation means and placement of the animal between said chamber.

14. An animal trap as in claim 1 further comprising access means movably attached to said housing and positioned in communicating relation with said attraction means.

15. An animal trap as in claim 1 further comprising air seal means mounted on said chamber means adjacent said entrance means and engagably therewith, whereby said seal prevents air from entering said chamber means when said entrance means is in a closed position.

16. An animal trap as in claim 1 further comprising vent means mounted on said trap in communicating relation with said chamber, said vent selectively positionable between an open and closed position whereby air may be vented to and from said chamber dependent upon the position of said vent.

17. An animal trap as in claim 1 wherein said attracting means comprises at least one bait piece connected to said actuation means.

18. An animal trap as in claim 17 wherein said actuation means comprises at least one weight element connected to said one bait piece and connection means arranged in interconnecting relation between said one bait piece and said weight element.

19. An animal trap as in claim 18 wherein said interconnecting means comprises at least one wire element connected to both said one weight element and said one bait piece.

20. An animal trap as in claim 1 wherein said actuation means comprises at least one wire element connected to at least one bait piece, and one weight element removably attached to said wire element.

21. An animal trap as in claim 20 wherein said wire element comprises a loop portion and a finger means integrally attached thereto, said loop portion specifically configured to have said weight element attached thereto.

22. An animal trap as in claim 21 wherein said wire element further comprises an elongated portion attached to a bait piece, a coil portion intergrally attached to said elongated portion, said loop portion being integrally attached to said coil portion whereby movement of said bait piece positions said wire element and said weight element relative thereto so as to cause removal of said weight element from said wire element.

23. An animal trap as in claim 22 wherein said attraction means further comprises bait display means mounted on said trap and disposed in visual communication with animals entering said trap.

24. An animal trap as in claim 22 wherein said display means comprises a substantially transparent barrier disposed between the remainder of said attraction area and the remainder of said display area.

* * * * *

UNITED STATES PATENT OFFICE
CERTIFICATE OF CORRECTION

Patent No. 3,791,065          Dated February 5, 1974

Inventor(s) FRANK H. SNOW

It is certified that error appears in the above-identified patent and that said Letters Patent are hereby corrected as shown below:

Column 1, line 20, delete second occurence of "salmonellosis"

Column 4, line 4, delete "travsversely" and insert therefor -- transversely --

Column 5, lines 17-18, delete "FIG. 6 in operation, cutaway, partial sectional view of the trap present invention." and insert therefor -- FIG. 6 is a cutaway, partial sectional view of the trap in operation. --

Column 5, line 22, delete "mvement" and insert therefor -- movement --

Column 6, line 19, delete "35" and insert therefor -- 34 --.

Signed and sealed this 6th day of August 1974.

(SEAL)
Attest:

McCOY M. GIBSON, JR.          C. MARSHALL DANN
Attesting Officer             Commissioner of Patents